T. Sellers,
Fruit Jar,
No. 1,573, Reissued Nov. 24. 1863.
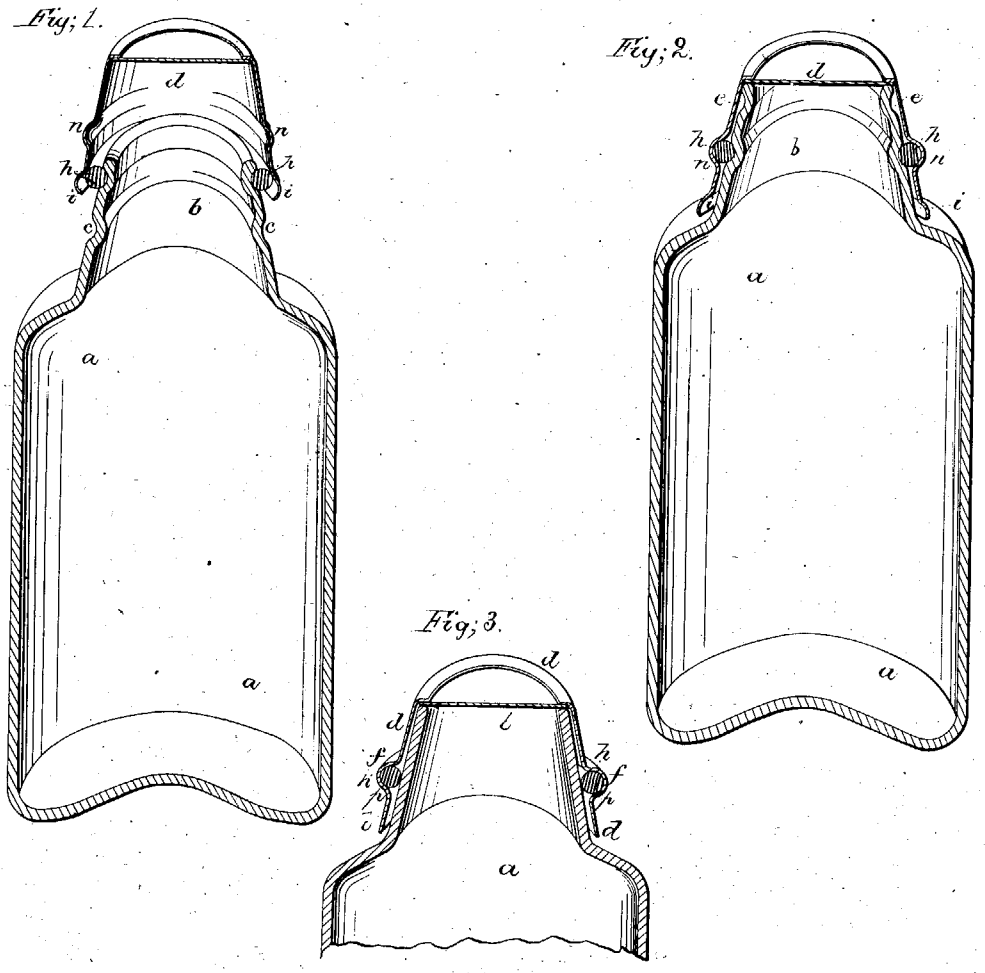
Witnesses;
Wm. H. Richards
A. Dechay.
Inventor;
John H. Griffin. By his attorney
J. N. McIntire

UNITED STATES PATENT OFFICE.

JOHN F. GRIFFEN, OF BROOKLYN, NEW YORK, ASSIGNEE, BY MESNE ASSIGNMENTS, OF THEODORE SELLERS, OF EAST BIRMINGHAM, PA.

IMPROVEMENT IN CLOSING PRESERVE-CANS.

Specification forming part of Letters Patent No. 28,413, dated May 22, 1860; Reissue No 1,573, dated November 24, 1863.

*To all whom it may concern:*

Be it known that THEODORE SELLERS, of East Birmingham, in the State of Pennsylvania, invented a new and useful Improvement in Preserve-Cans, of which the following is a full, clear, and exact description, reference being had to the accompanying drawings, making part of this specification, in which—

Figure 1 is a vertical sectional elevation of one of the improved preserve-cans. Fig. 2 is a similar view of the same, showing a different condition of the several portions thereof, as will be presently explained; and Fig. 3 is a partial sectional elevation of a preserve-can, showing another modification of the invention.

In the several figures the same letter of reference is employed to indicate the same part of the apparatus.

Previous to the invention numerous methods of constructing hermetically-sealing cans have been suggested and employed in which a rubber or other suitable packing has been used to make a tight joint between the jar and its cover or stopper; but in all such jars it has been customary to arrange the packing between the lid or cover and the mouth or neck of the jar in such a manner as that the packing should be pressed on its upper and lower surfaces by the lid and jar-mouth and be confined between these two parts by some sort of clamping or holder device—such as a bar with its ends arranged, in connection with lugs or grooves in the neck of the jar, to hold it down, and a screw passing through said bar and pressing on the top of the lid; or such as a screw cap or cover having a thread on it working in a corresponding thread formed in or on the neck of the jar, or some other mechanical arrangement for forcing and holding the lid and jar toward each other with the packing clamped between them.

The invention has for its objects to dispense with any clamping mechanism or device or screw-pressure to hold the two parts of the can together and in contact with the packing, and also to prevent the displacement or separation of the packing (from the parts with which it is used) when the cover or lid is taken off of the jar or can, and also to produce at the same time a simple and effective apparatus for hermetically sealing; and to these ends the invention consists in making the neck of the jar or can and the cover or lid tapering, as hereinafter described, and arranging a packing-ring of rubber, gutta-percha, or other suitable material between them, in such a manner as that by simply placing or forcing the cover over or around the neck of the jar the packing shall be compressed between these two parts and a perfectly-tight joint formed, as will be more fully explained hereinafter; and the invention further consists in retaining or holding the packing-ring within an annular groove formed either in the cover or jar, so that when the cover and jar are disconnected or separated the packing will remain in its groove or seat securely, and not be liable to get lost.

To enable others skilled in the art to fully understand the invention, so that they can make and use the same, I will proceed to describe the construction and operation of one of the improved hermetically-sealing jars or cans.

In Figs. 1 and 2, *a* is a jar or can, which may be made of glass, stoneware, tin, or any other suitable material, and of any desired design; and *d* is its lid or cover, which also may be made of any suitable material. *b* is the neck of the jar, and *h* is the packing-ring, of rubber, gutta-percha, or other suitably elastic material, which is confined between the cover *d* and the neck *b* of the jar, to hermetically seal the latter, as will be directly explained. The neck *b* is made tapering in shape, or similar to the frustum of a cone, and has on its external surface, near the top edge or mouth, an annular depression or groove, *e*, (see Fig. 2,) and farther down on the same surface another depression or groove, *c*. (See Fig. 1.) The cover or lid *d* is made about flat on top, and with its side or flange portion tapering to correspond with the neck *b*, over which it is placed. This cover *d* is formed with two annular depressions, *n* and *i*, on its internal tapering surface at a distance apart equal to the distance between the grooves *c* and *e* on the neck *b*.

With this description of the several parts, in connection with the drawings, Figs. 1 and 2, I will now explain their operation together.

When the jar is to be sealed, (the usual process of expelling the air being employed,) the packing-ring *h* is placed over the mouth of the neck *b* and into the annular depression *e*, as seen at Fig. 1, and the lid *d* is placed over the neck *b* and packing *h*, in the manner shown at Fig. 1, the shoulder formed by the depression *i* coming down onto the packing-ring. The cover *d* is now forced downward, whereby the ring *h* is caused to leave the groove *e*, and as the cover moves on downward the ring *h* moves more slowly in the same direction, and the several parts assume the relative positions seen at Fig. 2, the ring *h* being now in the depressions *c* and *n* of the neck and cover, respectively, and sufficiently compressed or squeezed between the adjacent surfaces of said neck and cover to form a tight joint between said surfaces and hermetically seal the jar.

At Fig. 3 I have illustrated another mode of carrying out the invention. In this figure, *a* is a portion of the jar, the neck *b* of which, in lieu of being shaped like that already described, is made tapering, without any annular depressions, and the cover *d* is made with only one annular depression, in lieu of two, as shown at Figs. 1 and 2; but this one depression, *f*, is made deeper than any of the others before alluded to, so as to receive into it a greater portion of the packing-ring *h*. In this modification of the invention the operation would be as follows, viz: When it is desired to seal the can, the ring *h* is placed or sprung into the groove *f* of the cover *d*. The latter is then placed over and around the neck *b* and forced down over it into the position shown at Fig. 3. The ring *h* will thus be sufficiently compressed between the plane tapering surface of the neck *b* and the internal surface of the flange or tapering portion of the cover *d*. To unseal the jar in either form shown, the cover *d* is pulled up and off of the neck *b*. In the form shown at Figs. 1 and 2 the ring *h*, when the cover is pulled off, will move back into the relative position with cover *d*, seen at Fig. 1, and will be retained in connection with the cover by means of the lip or lower (coupling) portion of groove *i*. In the form shown at Fig. 3 the ring *h*, when the cover is taken off, will remain in the groove *f*. The ring *h* is thus confined always in the cover, so that it is not liable to get mislaid or lost while the cover and jar are separated from each other. The portion *p* (see Fig. 3) should be so shaped as that the ring *h* can be conveniently forced into its seat or groove *f*. It will be seen that by the invention a tight joint is formed between the jar and its cover by simply forcing the two together, as explained; and it will be understood that the new mode of operation involved in the improved self-sealing jar may be embodied in various forms and arrangements together of the neck and cover. For instance, the flare or taper of the neck *b* and cover *d* may be reversed and the cover forced down inside of the neck, with the ring *h* between its external surface and the internal surface of the neck; or the neck *b* may be made straight, instead of tapering, with the ring *h* arranged in a groove therein and the lid or cover only made tapering to be forced down around and over the packing-ring; or the ring *h* may be arranged in a depression formed in the neck *b* (in lieu of in the cover shown at Fig. 3) and the cover *d* made plain on its tapering portion and forced down over the ring *h*; but it is apparent that all obvious changes of form, involving the same mode of operation by which any clamping or screw device or mechanism is rendered unnecessary, will accomplish the objects of the invention and be in accordance with the spirit thereof.

Having fully described the construction and operation of the invention, and not wishing to be understood as claiming as new the employment of a packing arranged between the adjacent surfaces of the jar or can and its cover, or making such adjacent surfaces tapering, what I do claim as the invention, and desire to secure by Letters Patent, is—

1. The employment of a yielding packing-ring arranged on either the jar neck or the cover, in combination with a neck and cover so constructed as that in forcing the two together the ring will be compressed and its yielding surfaces accommodated to the surfaces of the neck and cover and a tight joint be formed, substantially as described.

2. Providing either the cover or the jar-neck with a depression for the retention of the packing-ring when the cover and jar are separated, substantially as hereinbefore described.

In testimony whereof I have hereunto set my hand this 9th day of October, 1863.

JNO. F. GRIFFEN.

Witnesses:
J. N. McINTIRE,
A. DE LACY.